(12) United States Patent
Jung et al.

(10) Patent No.: US 8,449,421 B2
(45) Date of Patent: May 28, 2013

(54) TRANSMISSION FOR MOTOR AND CONTROLLING DEVICE THEREOF

(75) Inventors: Tae-Jin Jung, Cheongju-si (KR); Hyuk Yoo, Cheongju-si (KR)

(73) Assignee: MBI Co. Ltd., Chungcheongbuk-Do (KR)

( * ) Notice: Subject to any disclaimer, the term of this patent is extended or adjusted under 35 U.S.C. 154(b) by 793 days.

(21) Appl. No.: 12/523,209

(22) PCT Filed: Jan. 16, 2008

(86) PCT No.: PCT/KR2008/000278
§ 371 (c)(1),
(2), (4) Date: Jul. 15, 2009

(87) PCT Pub. No.: WO2008/088169
PCT Pub. Date: Jul. 24, 2008

(65) Prior Publication Data
US 2010/0016121 A1    Jan. 21, 2010

(30) Foreign Application Priority Data

Jan. 16, 2007  (KR) ......................... 10-2007-0004782
Aug. 31, 2007  (KR) ......................... 10-2007-0088549

(51) Int. Cl.
*F16H 48/00*        (2012.01)
(52) U.S. Cl.
USPC ..................................... 475/12; 475/4; 475/5

(58) Field of Classification Search
USPC .................................................. 475/12, 4, 5
See application file for complete search history.

(56) References Cited

U.S. PATENT DOCUMENTS

| | | | | |
|---|---|---|---|---|
| 4,446,757 | A | * | 5/1984 | La Fever .......................... 475/12 |
| 5,531,651 | A | * | 7/1996 | Yang ............................... 475/12 |
| 5,647,817 | A | | 7/1997 | Chang |
| 6,383,108 | B1 | | 5/2002 | Yoo |
| 6,459,225 | B1 | * | 10/2002 | Maruyama .................... 318/560 |

FOREIGN PATENT DOCUMENTS

| | | | |
|---|---|---|---|
| GB | 2109489 | A * | 6/1983 |
| JP | 02-104326 | | 4/1990 |
| KR | 1020060046009 | | 5/2006 |

* cited by examiner

*Primary Examiner* — David D Le
*Assistant Examiner* — Derek D Knight
(74) *Attorney, Agent, or Firm* — IPLA P.A.; James E. Bame

(57) ABSTRACT

A transmission is adapted to have a deceleration structure while generating an output in the same direction as when a motive power is rotated forwardly when the motive power is rotated reversely. The transmission includes a motor, an output cover, fixed shafts, and a transmission. The transmission is selectively connected according to the rotational direction of the driving shaft. The transmission provides a constant speed output in the forward direction since the driving shaft and the output cover are directly connected to each other when the driving shaft is rotated forwardly, but provides a decelerated output in the forward direction since a reduction planetary gear is geared between the driving shaft and the output cover when the driving shaft is rotated reversely.

8 Claims, 11 Drawing Sheets

TRANSMISSION FOR MOTOR AND CONTROLLING DEVICE THEREOF

TECHNICAL FIELD

The present invention relates to a transmission for a motor, and more particularly, to a transmission, which is adapted to perform either acceleration or deceleration when the rotational direction of a motor is changed, and a controlling device adapted to automatically control the transmission of the motor.

BACKGROUND ART

In general, a transmission is a device for accelerating or decelerating a motive power.

Such a transmission is coupled to a motor driving shaft to thereby automatically or manually change the speed of the motor power. In case of the manual transmission, a clutch is located between the motive power and the transmission to thereby achieve a speed change in a state where the motive power to the transmission is interrupted. In addition, the automatic transmission does not have a restraining means, such as the clutch, and automatically changes the speed according to a pressure change or the like of an output side.

However, the manual transmission according to a prior art has a problem in that it is inconvenient in use and it becomes bulky since the manual transmission essentially requires the clutch. In addition, the automatic transmission also encounters a problem in that it becomes bulky and it is frequently out of order since the automatic transmission itself is complicated in structure.

DISCLOSURE

Technical Problem

Accordingly, the present invention has been made in an effort to solve the above-mentioned problems occurring in the prior arts, and it is an object of the present invention to provide a transmission which is adapted to have a deceleration structure while generating an output in the same direction as when a motive power is rotated forwardly when the motive power is rotated reversely.

Another object of the present invention is to provide a transmission which is adapted to have an acceleration structure while generating an output in the same direction as when the motive power is rotated forwardly when the motive power is rotated reversely.

A further object of the present invention is to provide a controlling device adapted automatically change the speed of a motor having the above-mentioned transmission embedded therein.

Technical Solution

To achieve the first object, the present invention provides a transmission method for allowing a transmission to output a motive power of a motor, wherein the transmission provides a constant speed output in the forward direction when the motive power of the motor is provided forwardly, and provides a decelerated output in the forward direction when the motive power of the motor is provided reversely.

In addition, to achieve the first object, the present invention provides a transmission method for allowing a transmission to output a motive power of a motor, wherein the transmission provides a constant speed output in the forward direction when the motive power of the motor is provided forwardly, and provides an accelerated output in the forward direction when the motive power of the motor is provided reversely.

The transmission driven by the first method includes a ring gear to which a motive power of the motor is inputted; a transmission ring gear located on the outer peripheral surface of the ring gear and selectively restrained when the ring gear is rotated forwardly to thereby provide a constant speed output in the forward rotation; a sun gear located on the inner peripheral surface of the ring gear and selectively restrained when the ring gear is rotated reversely; and a transmission planetary gear geared to the outer peripheral surface of the sun gear and the inner peripheral surface of the transmission ring gear to thereby provide a decelerated output in the forward rotation to the transmission ring gear.

In this instance, the ring gear includes: at least one constant speed pole formed on the outer peripheral surface thereof and elastically supported in a slant line direction in such a way as to be restrained to the transmission ring gear only during a forward rotation thereof; and at least one variable speed pole formed on the inner peripheral surface thereof and elastically supported in the slant line direction in such a way as to be restrained to the sun gear only during a reverse rotation thereof.

Moreover, the transmission further includes a backward interference prevention unit disposed at the rear sides of the constant speed pole and the variable speed pole and coupled to the motor so as to be rotated frictionally to thereby press any one of the constant speed pole and the variable speed pole, wherein the backward interference prevention unit has a retaining protrusion formed therein and the ring gear has a retaining groove formed correspondingly to the retaining protrusion, the retaining groove being formed wider than the retaining protrusion so that a clearance is defined between the retaining protrusion and the retaining groove.

Alternatively, the ring gear includes ball seating grooves formed on the outer peripheral surface and the inner peripheral surface thereof in such a way as to get gradually deeper as it goes in one direction and in such a way that the inner peripheral surface and the outer peripheral surface of the ring gear are formed in the opposite directions to each other; clutch plates arranged on the inner and outer peripheral surfaces thereof and having a plurality of clutch bearings so as to be inserted into the ball seating grooves, so that the clutch plates can be substituted for the constant speed pole, the variable speed pole, and the backward interference prevention unit.

The transmission driven by the first method includes: a one-way clutch (C) coupled to an end of a motor driving shaft in such a way as to be directly connected to an output side, whereby the output side provides a constant speed output in the forward direction; and a one-way clutch (RC) coupled to the middle of the motor driving shaft and geared to the output side and a planetary gear, whereby the output side provides a decelerated output in the forward direction.

Also, the transmission driven by the first method includes: a one-way clutch (C) coupled to an end of a motor driving shaft in such a way as to be directly connected to an output side, whereby the output side provides a constant speed output in the forward direction; and a one-way clutch (RC) coupled to the middle of the motor driving shaft and geared to the output side and a planetary gear, the planetary gear having a carrier mounted thereon and coupled to the motor via the one-way clutch (RC), whereby the output side provides a decelerated output in the forward direction.

In addition, The transmission driven by the first method includes: a planetary gear geared to a motor driving shaft; a one-way clutch (C) for coupling an output side serving as a carrier with a side of the planetary gear; and a one-way clutch (RC) for coupling a carrier fixed to the other side of the planetary gear with the motor, whereby the output side provides a constant speed output in the forward direction when the planetary gear is revolved but provides a decelerated output in the forward direction when the planetary gear is rotated.

The transmission driven by the second method includes: a one-way clutch (C) coupled to an end of a motor driving shaft in such a way as to be directly connected to an output side, whereby the output side provides a constant speed output in the forward direction; a one-way clutch (RC) coupled to the middle of the motor driving shaft and coupled to a ring gear; and a planetary gear geared between the ring gear and the output side, whereby the output side provides an accelerated output in the forward direction.

Also, the transmission driven by the second method includes: a one-way clutch (C) coupled to an end of a motor driving shaft in such a way as to be directly connected to an output side, whereby the output side provides a constant speed output in the forward direction; a ring gear coupled to the middle of the motor driving shaft and geared to the output side and a planetary gear; and a one-way clutch (RC) for coupling a carrier of the planetary gear to the motor, whereby the output side provides a decelerated output in the forward direction.

In addition, the transmission driven by the second method includes: a ring gear coupled to a motor driving shaft; a planetary gear geared to the ring gear; a one-way clutch (C) for coupling an output side serving as a carrier with a side of the planetary gear; and a one-way clutch (RC) for coupling a carrier fixed to the other side of the planetary gear with the motor, whereby the output side provides a constant speed output in the forward direction when the planetary gear is revolved but provides an accelerated output in the forward direction when the planetary gear is rotated.

To achieve the third object, the present invention provides a controlling device for automatically controlling a motor having a transmission, which provides a constant speed output in the forward direction when a motive power is provided in the forward direction but provides a decelerated output in the forward direction when the motive power is provided in the reverse direction, the controlling device comprising: a throttle to which an output signal is input; a controller adapted to receive the inputted signal and supplying electric current, the controller being connected to the motor; and a hole sensor mounted on the motor and connected to the controller, whereby the controller provides a reverse current when a load is applied to the motor.

Advantageous Effects

As described above, the transmission for the motor according to the present invention provides a one-way output irrespective of the rotational direction of an input and can perform deceleration or acceleration of the output when the direction of the input is changed. In the present invention, the motor embedded in the transmission is a brushless motor (BLDC) of a relatively high torque, and hence, can be sufficiently driven just by a two-stage transmission without a multi-stage transmission.

In addition, advantageously, the transmission can be formed integrally with the motor to thereby realize a small-sized transmission motor, and thus, may be used even in a device, such as a bicycle, a motorcycle or the like, which is disadvantageous if the transmission protrudes to the outside of the device.

MODE FOR INVENTION

Reference will be now made in detail to the preferred embodiment of the present invention with reference to the attached drawings.

Figure 1:
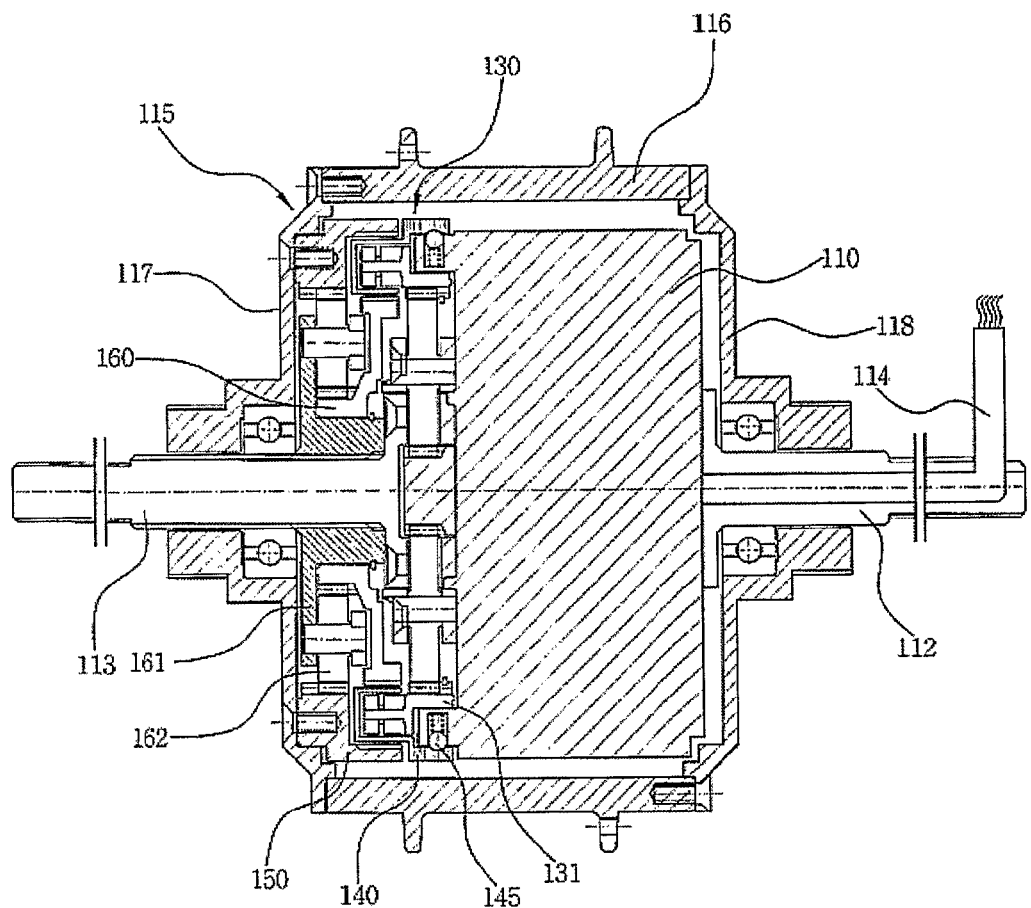
FIGS. 1 and 2 are sectional views showing an example that a transmission according to the present invention is applied to an inner rotor type motor.
Figure 2:
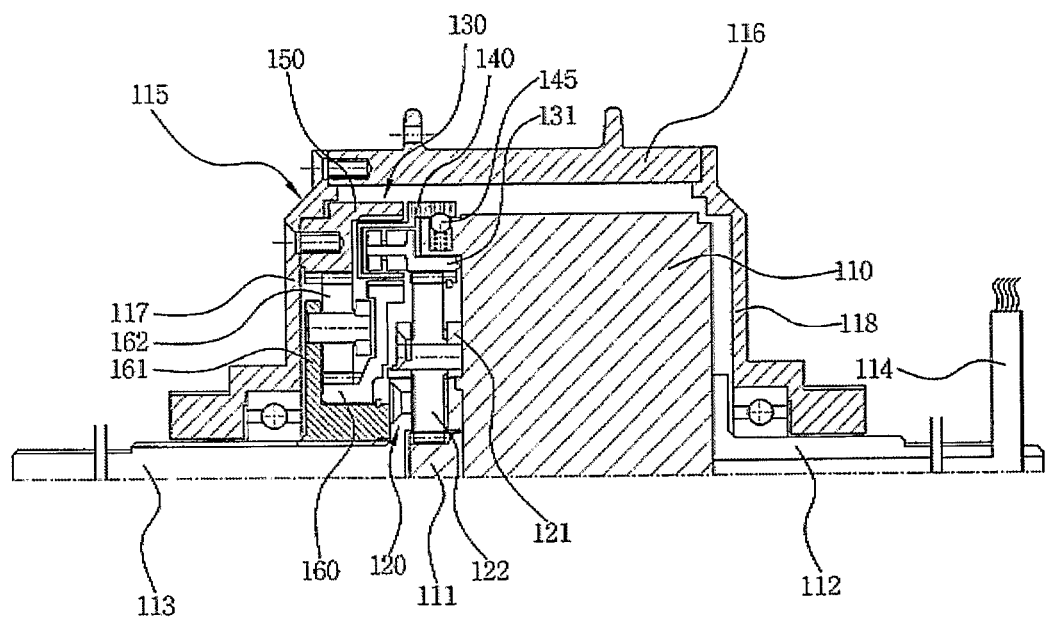
Figure 3:
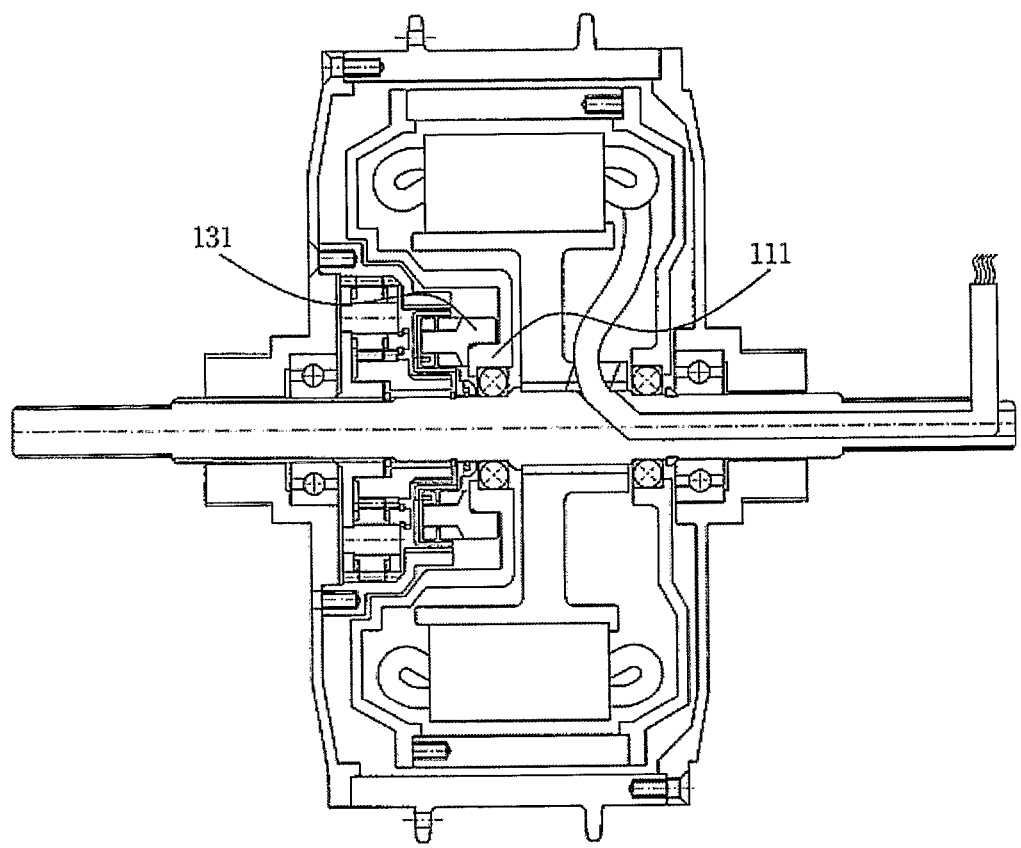
FIG. 3 is a sectional view showing an example that the transmission according to the present invention is applied to an outer rotor type motor.

FIGS. 1 to 3 are sectional views of a transmission for a motor according to the present invention, wherein FIGS. 1 and 2 illustrate the transmission applied to an inner rotor type motor, and FIG. 3 illustrates the transmission applied to an outer rotor type motor.

Preferably, FIGS. 1 to 3 illustrate a motor for a motorcycle, but the present invention can be applied to other various devices, for instance, transportation machines such as vehicles, industrial machines such as electromotive tools or the like, and toys.

As shown in FIGS. 1 and 2, the present invention includes: a motor 110 supplied with power to rotate; an output cover 115 adapted to surround the outside of the motor 110 and rotated by a rotational force of the motor 110; a first fixed shaft 113 extending to a side of the output cover 115; a second fixed shaft 112 extending to the other side of the output cover 115; and a transmission 130 disposed between the motor 110 and the first fixed shaft 113 or between the motor 110 and the second fixed shaft 112.

In this instance, the output cover 115 includes an intermediate cover 116 adapted to surround the outer peripheral surface of the motor 110, and right and left covers 117 and 118 adapted to surround the right side and the left side of the motor 110. In addition, typical power transmission means like a gear, sprocket or a pulley for connecting driving power are disposed at one side of the left cover 117 and the other side of the right cover 118.

Furthermore, bearings are embedded between the first fixed shaft 113 and the left cover 117 and between the second fixed shaft 112 and the right cover 118 for securing a smooth rotation.

Moreover, a power cable 114 for applying power to the motor 110 is aligned so as to pass through the inside of the second fixed shaft.

The transmission 130 includes a deceleration part 120 and a transmission part. Alternatively, the transmission 130 may include only the deceleration part 120. That is, the deceleration part 120 first decelerates a driving force of the motor 110, and then, transmits the decelerated driving force to the transmission part. The deceleration can be achieved by having a reduction planetary gear 122 mounted between a driving shaft 111 and a ring gear 131. In this instance, a carrier for fixing the reduction planetary gear 122 is essentially required. The carrier 121 is attached and coupled to the motor 110.

Alternatively, the driving shaft 111 and the ring gear 131 may be directly coupled to each other without mounting the reduction planetary gear 122 to thereby transmit power without any deceleration.

In addition, since the outer rotor type motor shown in FIG. 3 does not adopts a shaft-based operation method, the driving shaft 111 of the motor 110 may serve as the ring gear 131.

The transmission part is connected to the above-mentioned ring gear 131. The transmission part includes a transmission ring gear 150 selectively restrained to the outside of the ring gear 131, a sun gear 160 selectively restrained to the inside of the ring gear 131, and a transmission planetary gear 162 radially geared to the outside of the sun gear 160 and geared to the inside of the transmission ring gear 150.

In this instance, the transmission ring gear 150 has two-stage layers of different diameters, and is coupled to the ring gear 131 at the first stage and geared to the transmission planetary gear 162 at the second stage. In addition, the sun gear 160 has two-stage layers of different diameters, and is coupled to the ring gear 131 at the first stage and geared to the transmission planetary gear 162 at the second stage.

Furthermore, the transmission ring gear 150 is coupled to the output cover 115 via screws or the like, to thereby transmit the rotational force of the transmission ring gear 150 to the output cover 115.

Moreover, the present invention essentially needs a transmission carrier for fixing the transmission planetary gear 162, and the transmission carrier 161 is coupled integrally to the outside of the first fixed shaft 113.

In the meantime, in order to selectively restrain the rotational force of the ring gear 131 to the transmission ring gear 150 or the sun gear 160, a constant speed pole 132 and a variable speed pole 133 are provided on the ring gear 131.

Figure 4A:
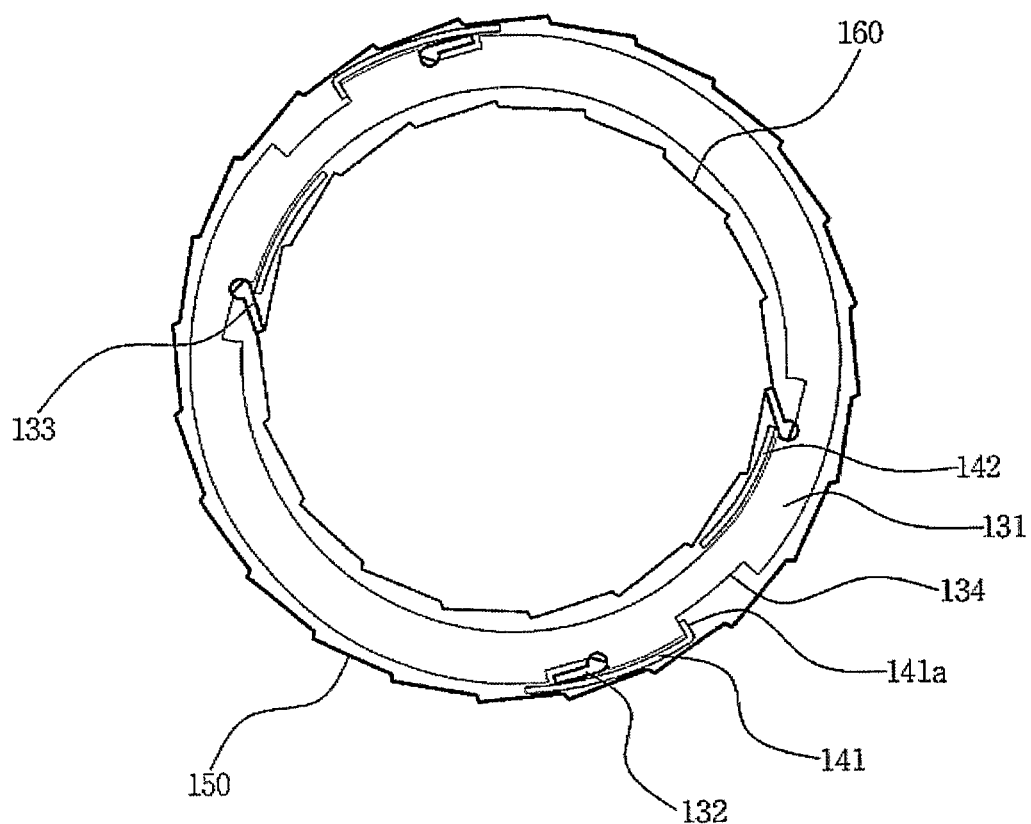
FIGS. 4a and 4b are views for showing an operational principle of a backward interference prevention unit shown in FIG. 3.
Figure 4B:
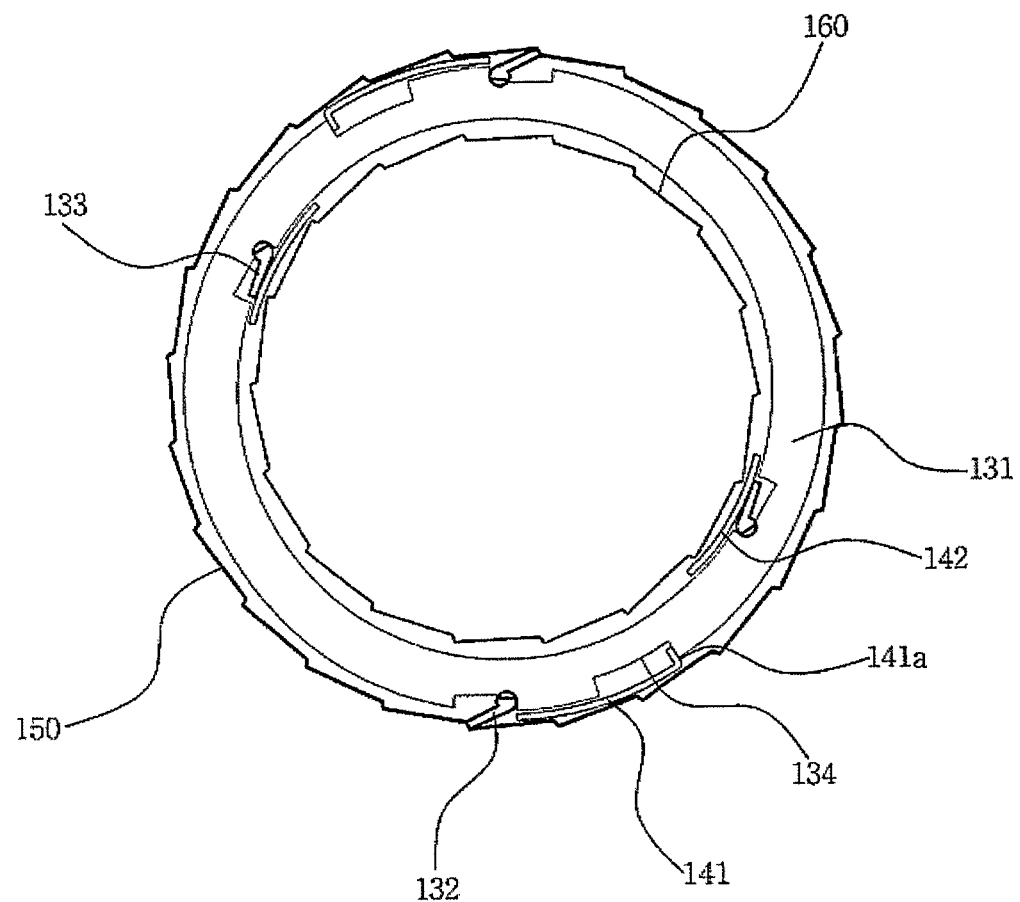

FIGS. 4a and 4b illustrate an operation of the transmission selectively restrained by the constant speed pole and the variable speed pole. As shown in FIGS. 4a and 4b, at least one constant speed pole 132 and at least one variable speed pole 133 are protrudently formed on the outer peripheral surface and the inner peripheral surface of the ring gear 131 in opposite oblique line directions to each other. In this instance, each of the constant speed pole 132 and the variable speed pole 133 is hinge-coupled at one end thereof to the ring gear 131, and springs (compression spring, pin spring, and so on) are embedded between the constant speed pole 132 and the ring gear 131 and between the variable speed pole 133 and the ring gear 131 to thereby elastically support the constant speed pole 132 and the variable speed pole 133.

Thus, when the ring gear 131 is rotated in any one direction, any one of the transmission ring gear 150 and the sun gear 160 is connected to the ring gear 131, so that a driving force is transmitted thereto.

In more detail, for instance, when the motor 110 rotates forwardly, the planetary gear 122 and the ring gear 131 are rotated reversely. The reverse rotation of the ring gear 131 causes the variable speed pole 133 to restrain the sun gear 160 to allow the sun gear to rotate reversely. Then, while the transmission planetary gear 162 and the transmission ring gear 150 are rotated forwardly, the output cover 115 provides a decelerated output in the forward rotation.

In addition, when the motor 110 rotates reversely, the planetary gear 122 and the ring gear 131 are rotated forwardly. The forward rotation of the ring gear 131 causes the constant speed pole 132 to engage the ring gear 131 with the transmission ring gear 150 and provides a constant speed output to the output cover 115.

That is, the transmission part generates power in the ratio of 1:1 when the motor 110 rotates reversely, and generates power in the ratio of 1:0.5 when the motor 110 rotates forwardly.

Meanwhile, in case of the outer rotor type motor, which does not have the deceleration part 120, when the motor 110 rotates reversely, the ring gear 131 is automatically rotated reversely. The reverse rotation of the ring gear 131 causes the variable speed pole 133 to restrain the sun gear 160 to allow the sun gear to rotate reversely. In this instance, while the transmission planetary gear 162 and the transmission ring gear 150 are rotated forwardly, the output cover 115 provides the decelerated output in the forward rotation. On the contrary, when the motor 110 rotates forwardly, the ring gear 131 is automatically rotated forwardly. The forward rotation of the ring gear 131 causes the constant speed pole 132 to restrain the transmission ring gear 150 so as to provide the constant speed output in the forward rotation to the output cover 115.

While the transmission 130 provides an output smoothly by the driving of the motor 110, the output cover 115 may be rotated reversely by an external force in a device such as a motorcycle. Likewise, when the output cover 115 is rotated reversely by the external force, both the constant speed pole 132 and the variable speed pole 133 act to the ring gear 131 to cause the ring gear not to be operated.

In order to prevent the non-operation of the ring gear, a backward interference prevention unit 140 is disposed at the ring gear 131.

The backward interference prevention unit 140 is provided between the motor 110 and the ring gear 131 provided with the constant speed pole 132 and the variable speed pole 133. As shown in FIG. 2, the backward interference prevention unit 140 includes: a constant speed pole pressing plate 141 coupled to the motor 110 so as to have a given friction by a ball body 145 elastically supported on the outer peripheral surface of the motor 110, the constant speed pole pressing plate 141 extending to the rear side of the constant speed pole 132 formed on the ring gear 131; and a variable speed pole pressing plate 142 surrounding the ring gear 131 and extending inwardly to the rear side of the variable speed pole 133.

In addition, the constant speed pole pressing plate 141 has a retaining protrusion 141a formed integrally therein, and the ring gear 131 has a retaining groove 134 formed on the outer peripheral surface thereof in correspondence with the retaining protrusion 141. In this instance, it is preferable that the retaining groove 134 is formed wider than the retaining protrusion 141a so that a clearance can be defined in the retaining groove 134 when the retaining protrusion 141a moves.

Accordingly, since the backward interference prevention unit 140 presses any one of the constant speed pole 132 and the variable speed pole 133, the non-operation of the ring gear 131 due to the reverse rotation of the transmission ring gear 150 can be resolved.

That is, when the motor 110 rotates forwardly and the ring gear 131 is rotated reversely, as shown in FIG. 4a, the retaining protrusion 141a is caught by a side of the retaining groove 134 after a small clearance has been generated in the retaining groove 134. In this instance, while the ring gear 131 is rotated in a state where the clearance is formed, the constant speed pole pressing plate 141 of the backward interference prevention unit 140 presses the constant speed pole 132. On the contrary, when the motor 110 rotates reversely and the ring gear 131 is rotated forwardly, as shown in FIG. 4b, the variable speed pole pressing plate 142 of the backward interference prevention unit 140 presses the variable speed pole 133 with a given clearance formed. Thus, even though the transmission ring gear 150 is rotated reversely when the transmission is moved backwardly by the backward interference prevention unit 140, the non-operation of the ring gear can be prevented since at least one of the constant speed pole 132 and the variable speed pole 133 is pressed.

In the above, while the restraining method by the constant speed pole 132 and the variable speed pole 133 and the restraining method by the backward interference prevention unit 140 have been described, a restraining method by a clutch bearing may be selected.

Figure 5:
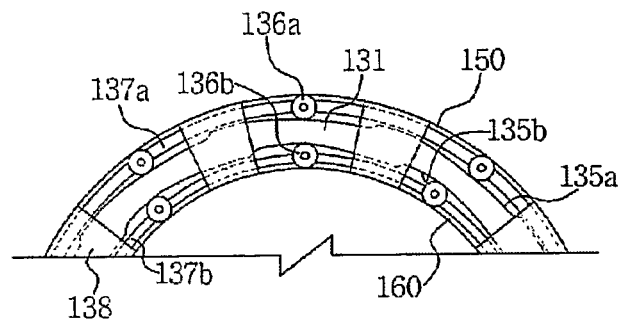
FIGS. 5 and 6 are views showing a restraining means by a clutch bearing, which can be used in stead of a variable speed pole and a constant speed pole.
Figure 6:
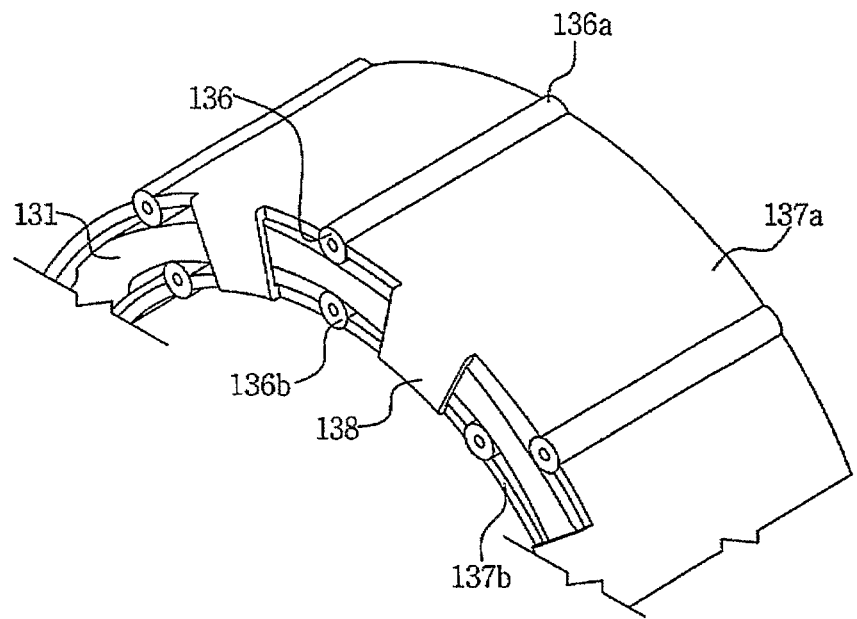

FIGS. 5 and 6 illustrate the restraining method by the clutch bearing, which can be used as a substitute of the constant speed pole, the variable speed pole and the backward interference prevention unit.

Referring to FIGS. 5 and 6, ball seating grooves 135a and 135b are formed on the outer peripheral surface and the inner peripheral surface of the ring gear 131, and clutch bearings 136a and 136b are respectively seated in the ball seating grooves 135a and 135b. In this instance, the ball seating grooves 135a and 135b get gradually deeper toward a side thereof, and the inside and the outside of the ring gear 131 are formed in the opposite directions to each other. Thus, when the ring gear 131 is rotated in only any one direction, since one of the clutch bearings 136a and 136b is caught by the ring gear 131 but the other one is not caught by the ring gear 131, the ring gear 131 can be rotated only in one direction.

Furthermore, since the clutch bearings 136a and 136b performs the role of the backward interference prevention unit 140, the backward interference prevention unit 140 is not needed. In this instance, the clutch bearings 136a and 136b are mounted on the outer peripheral surface and the inner peripheral surface of the ring gear 131 by clutch plates 137a and 137b. When the clutch bearings 136a and 136b are restrainably rotated, the clutch plates 137a and 137b are also rotated together. Moreover, the outer clutch plate 137a and the inner clutch plate 137b of the ring gear 131 are joined with each other via a connection member 138.

In the meantime, dissimilarly to the above embodiments, various possible methods for deceleration will be discussed below.

FIGS. 7a, 7b, 7c and 7d are schematic views showing deceleration by one-way clutches (C and RC).

Figure 7A:
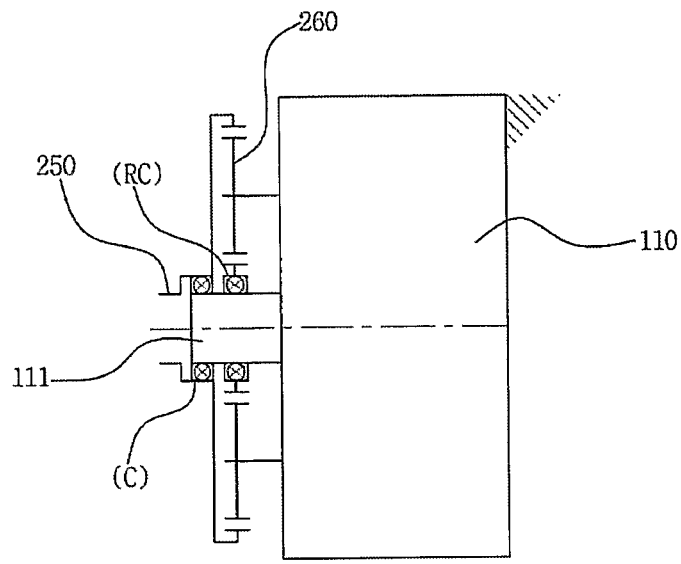
FIGS. 7a, 7b, 7c and 7d are views showing a deceleration method of a transmission according to another embodiment of the present invention.

First, in FIG. 7a, the one-way clutch (C) is embedded at an end of the driving shaft 111 of the motor 110, so that an output side 250 is directly connected to the driving shaft 111 of the motor 110 in the forward direction when the motor 110 rotates forwardly. In addition, the one-way clutch (RC) is also embedded at the middle of the driving shaft 111, and geared to the output side 250 through the planetary gear 260, so that the output side can provide the decelerated output in the front direction.

Figure 7B:
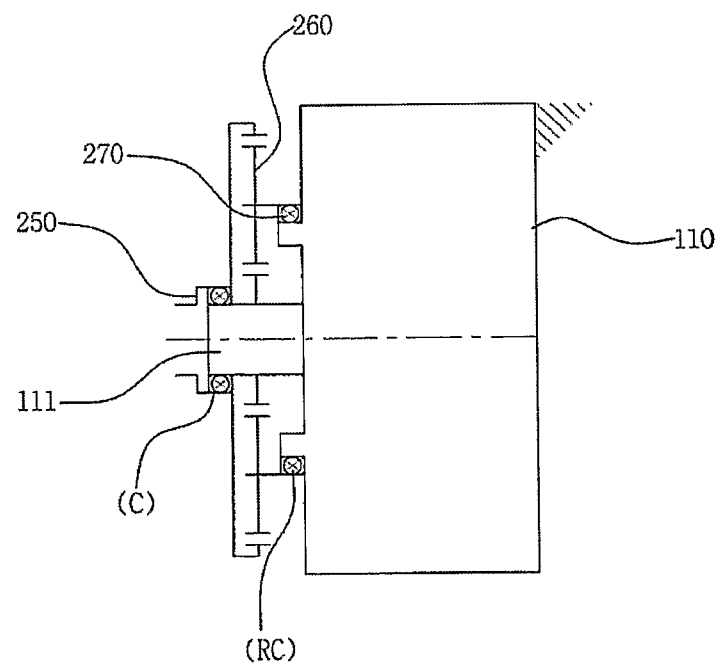

And, in FIG. 7b, the one-way clutch (C) is embedded at an end of the driving shaft 111 of the motor 110, and the output side 250 is directly connected to driving shaft 111 of the motor 110 in the forward direction when the motor 110 rotates forwardly. In addition, the planetary gear 260 is geared to the middle of the driving shaft 111 so that the planetary gear 260 can be geared to the output side during the reduction of speed. At this time, the one-way clutch (RC) may be coupled between a carrier 270, to which the planetary gear 260 is fixed, and the motor 110.

Figure 7C:
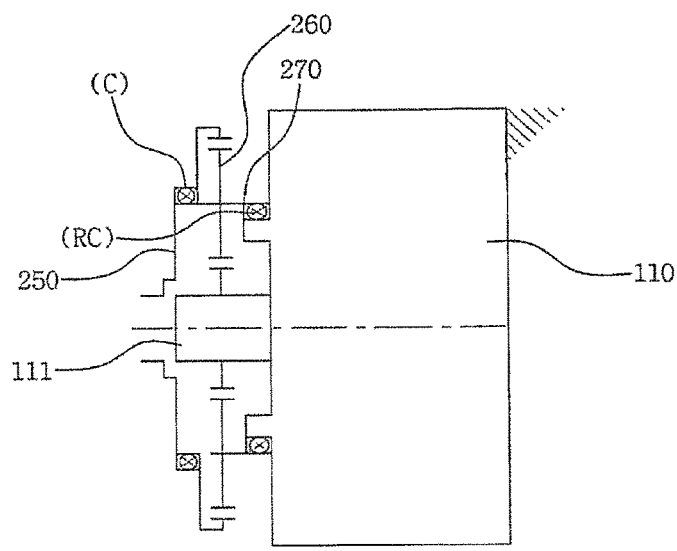

Further, In FIG. 7c, the planetary gear 260 is geared to the driving shaft 111, the carrier 270, to which the planetary gear 260 is fixed, is connected to the motor 110 and the one-way clutch (RC), and the output side 250 is disposed at a side of the planetary gear 260 so as to serve as a carrier. In this instance, the output side 250 has the one-way clutch (C) embedded therein to thereby provide an output. That is, when the driving shaft 111 rotates forwardly, the planetary gear 260 rotates about the driving shaft thereby provide a constant speed output. On the other hand, when the driving shaft 111 rotates reversely, the planetary gear 260 rotates by itself to thereby provide a decelerated output.

Figure 7D:
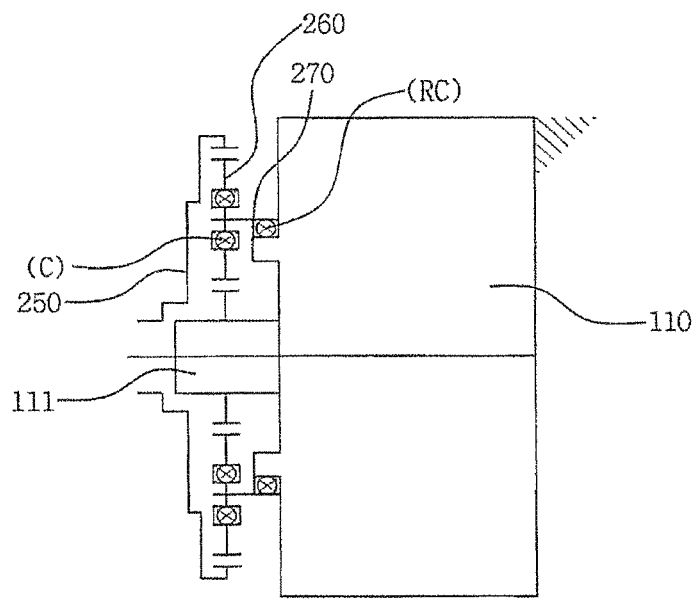

Then, in FIG. 7d, the planetary gear 260 is geared to the driving shaft 111 and the output side 250, and has the one-way clutch (C) embedded therein. The planetary gear 260 is fixed integrally to the carrier 270, and the carrier 270 is coupled to the motor 110 via the one-way clutch (RC). Thus, when the driving shaft 111 rotates forwardly, the planetary gear 260 rotates about the driving shaft under restraint of the one-way clutch (C) of the planetary gear 260, so that the output side 250 provides the constant speed output in the forward rotation. When the driving shaft 111 rotates reversely, the planetary gear 260 rotates by itself by under restraint of the one-way clutch (RC) of the carrier 270, so that the output side 250 provides the decelerated output in the forward rotation.

While a deceleration type of the transmission 120 has been described in the above, an acceleration type of the transmission 120 will be described below.

FIGS. 8a, 8b, 8c and 8d are schematic views showing the acceleration of the transmission 120 using the one-way clutch.

Figure 8A:
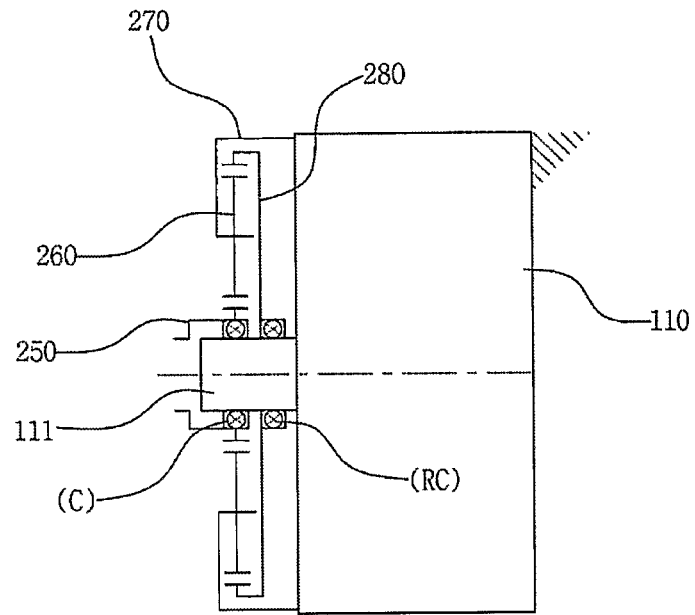
FIGS. 8a, 8b, 8c and 8d are views showing an acceleration method of the transmission according to the embodiment of the present invention.

First, in FIG. 8a, the one-way clutch (C) is mounted at an end of the driving shaft 111 such that the output side is directly connected to the driving shaft 111 to thereby provide the constant speed output. In addition, a ⊓-shaped ring gear 280 is connected to the middle of the driving shaft 111 via the one-way clutch (RC), and geared to the output side 250 through the planetary gear 260, so that the output side provides an accelerated output.

Figure 8B:
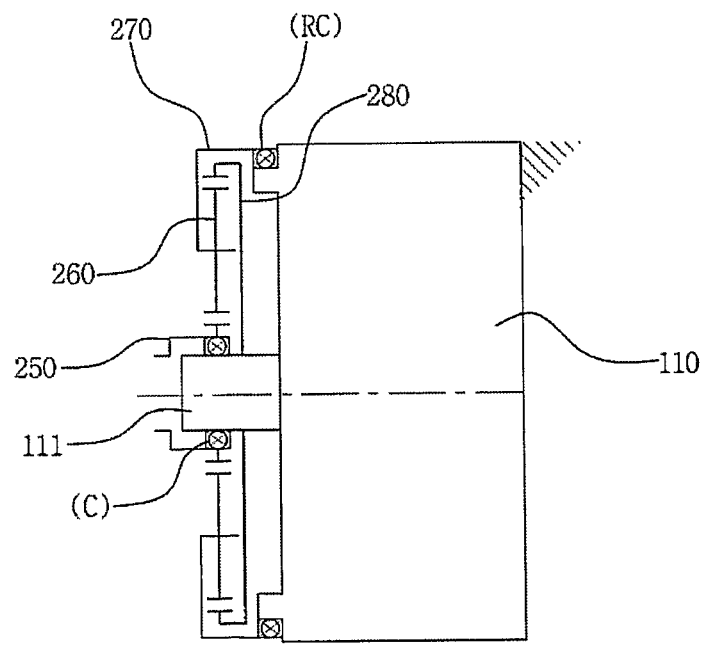

Also, in FIG. 8b, the one-way clutch (C) is mounted at an end of the driving shaft 111 such that the output side is directly connected to the driving shaft 111 to thereby provide the constant speed output. In addition, a ⊓-shaped ring gear 280 is connected to the middle of the driving shaft and geared to the output side 250 through the planetary gear 260, so that the output side 250 provides the accelerated output. In this instance, the carrier 270, to which the planetary gear 260 is fixed, may be coupled to the motor 110 via the one-way clutch (RC).

Figure 8C:
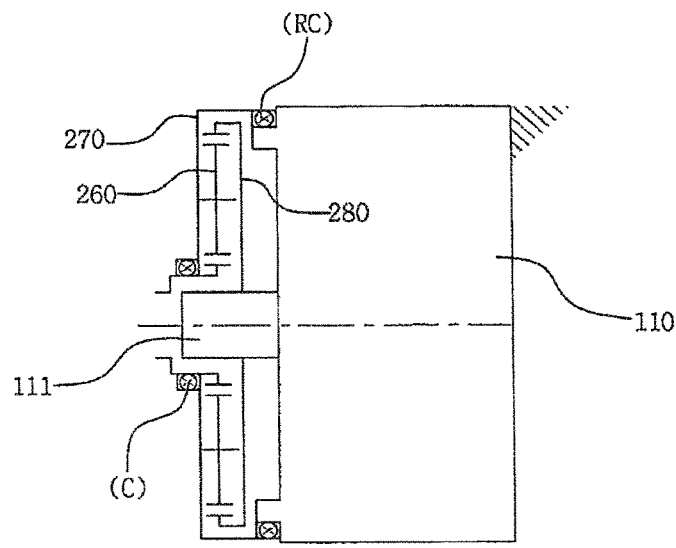

In addition, in FIG. 8c, the ring gear 280 is coupled to the driving shaft 111, and geared to the output side 250 through the planetary gear 260, so that the output side 250 provides the constant speed output or the accelerated output. The carrier 270 is coupled to a side of the planetary gear 260. In this instance, a side of the carrier 270 is coupled to the motor 110 via the one-way clutch (RC) and the other side of the carrier 270 is coupled to the output side 250 via the one-way clutch (C). That is, when the driving shaft 111 rotates forwardly, the ring gear 280 is rotated forwardly and the planetary gear 260 rotates about the driving shaft, so that the output side 250 provides the constant speed output. However, when the driving shaft 111 rotates reversely, the ring gear 280 is rotated reversely and the planetary gear 260 rotates by itself, so that the output side 250 provides the accelerated output.

Figure 8D:
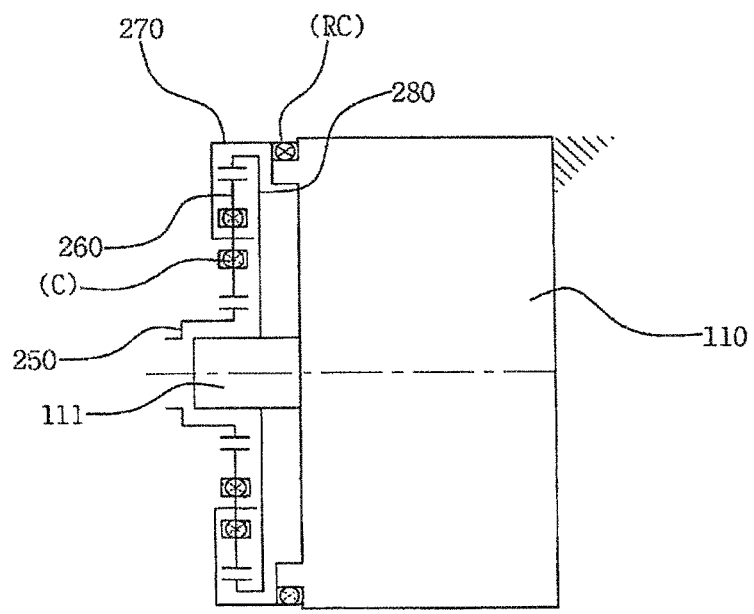

Further, in FIG. 8d, the ring gear 280 is coupled to the driving shaft 111, and the planetary gear 260 is geared to the ring gear 280 and the output side 250. and in this instance, the planetary gear 260 has the one-way clutch (C) embedded therein. The planetary gears 260 are fixed integrally to the carrier 270, and the carrier 270 is coupled to the motor 110 via the one-way clutch (RC). Thus, when the driving shaft 111 rotates forwardly, the planetary gear 260 rotates about the driving shaft under restraint of the one-way clutch (C) of the planetary gear 260 side, so that the output side 250 provides the constant speed output in the forward rotation. When the driving shaft 111 rotates reversely, the planetary gear 260 rotates by itself under restraint of the one-way clutch (RC) of the carrier 270 side. so that the output side 250 provides the accelerated output in the forward rotation.

Figure 9:
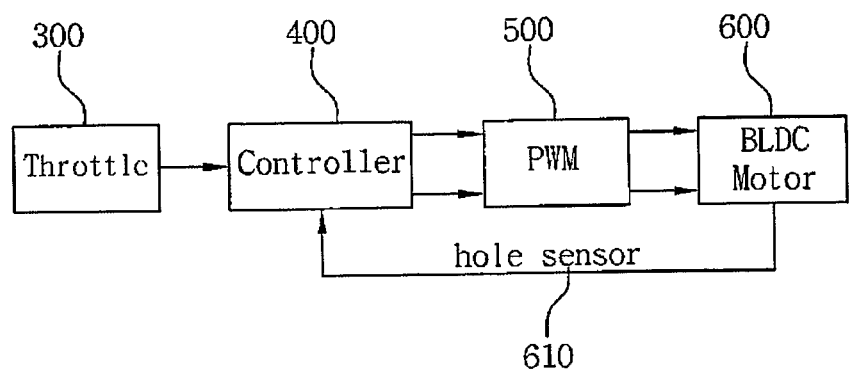
FIG. 9 is a block diagram showing a controlling device for automatically changing the speed of the motor, to which the transmission of the present invention is applied.

FIG. 9 is a block diagram showing a controlling device for automatically controlling a BLDC transmission motor, to which the transmission of the present invention is applied.

Referring to FIG. 9, the controlling device according to the present invention includes a BLDC motor 600, a PWM 500, a controller 400, and a throttle 300.

In this instance, the BLDC motor 600 includes a hole sensor 610 adapted to check a rotational force of the BLDC motor 600.

Now, the operation of the controlling device will be described. First, when the throttle 300 sends desired acceleration signals to the controller 400, the controller 400 calculates them and sends electric current corresponding to the acceleration signals to the PWM 500. The electric current is transmitted to the BLDC motor 600 through the PWM 500 to thereby rotate the motor 600.

In the meantime, the hole sensor 610 mounted on the motor 600 checks the rotational frequency of the motor and applies the checked rotational frequency to the controller 40. The controller 400 carrying out an operation of the rotational frequency determines that load is applied to the motor if the rotational frequency is less than the amount of the transmitted electric current, and generates a reverse current. Thus, the reverse current is supplied to the BLDC motor 600 through the PWM 500, so that the motor is rotated reversely. Then, the transmission is decelerated by the motor, which is rotated reversely.

That is, the fact that a load is applied to the motor means, for instance, that a motorcycle, to which the transmission motor of the present invention is applied, encounter a sloping road or heavy things are put on the motorcycle. Therefore, in this case, it is preferable that the transmission is decelerated to a lower stage.

Of course, when a load is removed from the motor, the controller sends a signal of the forward direction to the motor, so that the motorcycle runs forwardly.

INDUSTRIAL APPLICABILITY

As described above, the transmission for the motor according to the present invention provides a one-way output irrespective of the rotational direction of an input and can perform deceleration or acceleration of the output when the direction of the input is changed. In the present invention, the motor embedded in the transmission is a brushless motor (BLDC) of a relatively high torque, and hence, can be sufficiently driven just by a two-stage transmission without a multi-stage transmission.

In addition, advantageously, the transmission can be formed integrally with the motor to thereby realize a small-sized transmission motor, and thus, may be used even in a device, such as a bicycle, a motorcycle or the like, which is disadvantageous if the transmission protrudes to the outside of the device.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

The invention claimed is:

1. A transmission for a motor comprising:
    a ring gear to which a motive power of the motor is inputted;
    a transmission ring gear selectively restrained to an outside of the ring gear when the ring gear is rotated forwardly to thereby provide a constant speed output in the forward rotation;
    a sun gear selectively restrained to an inside of the ring gear when the ring gear is rotated reversely; and
    a transmission planetary gear geared to an outer peripheral surface of the sun gear and an inner peripheral surface of the transmission ring gear to thereby provide a decelerated output in the forward rotation to the transmission ring gear.

2. The transmission according to claim 1, wherein the ring gear includes: at least one constant speed pole formed on an outer peripheral surface thereof and elastically supported in a slant line direction in such a way as to be restrained to the transmission ring gear only during a forward rotation thereof; and at least one variable speed pole formed on an inner peripheral surface thereof and elastically supported in the slant line direction in such a way as to be restrained to the sun gear only during a reverse rotation thereof.

3. The transmission according to claim 2, further comprising a backward interference prevention unit disposed at a rear sides of the constant speed pole and the variable speed pole and coupled to the motor so as to be rotated frictionally to thereby press any one of the constant speed pole and the variable speed pole, wherein the backward interference prevention unit has a retaining protrusion formed therein and the ring gear has a retaining groove formed correspondingly to the retaining protrusion, the retaining groove being formed wider than the retaining protrusion so that a clearance is defined between the retaining protrusion and the retaining groove.

4. The transmission according to claim 1, wherein the ring gear includes ball seating grooves formed on an outer peripheral surface and an inner peripheral surface thereof in such a way as to get gradually deeper as it goes in one direction and in such a way that the inner peripheral surface and the outer peripheral surface of the ring gear are formed in the opposite directions to each other; a plurality of clutch bearings mounted on the inner and outer peripheral surfaces of the ring gear by clutch plates; and a connection member adapted to bind the outer clutch plate and the inner clutch plate together.

5. A controlling device for automatically controlling a motor having the transmission according to claim 1, wherein the controlling device comprising:
    a throttle to which an output signal is input;
    a controller adapted to receive the inputted signal and supplying electric current, the controller being connected to the motor; and
    a hole sensor mounted on the motor and connected to the controller.

6. A transmission for a motor comprising: a planetary gear geared to a motor driving shaft; a first one-way clutch (C) for coupling an output side of the transmission serving as a first carrier with a side of the planetary gear; and a second one-way clutch (RC) for coupling a second carrier fixed to the other side of the planetary gear with the motor, whereby the output side provides a constant speed output in a forward direction when the planetary gear is revolved but provides a decelerated output in the forward direction when the planetary gear is rotated with respect to the constant speed output.

7. A transmission for a motor comprising: a planetary gear geared to a motor driving shaft and an output side of the transmission; and a first one-way clutch (C) embedded in a planetary gear, wherein the planetary gears includes a carrier mounted thereon and the carrier is coupled to the motor via a second one-way clutch (RC), whereby the output side provides a constant speed output in the forward direction when the planetary gear is revolved but provides a decelerated output in the forward direction when the planetary gear is rotated with respect to the constant speed output.

8. A transmission for a motor comprising: a ring gear coupled to a motor driving shaft; a planetary gear geared to the ring gear and an output side of the transmission, the planetary gear having a first one-way clutch (C) embedded therein, wherein the planetary gears are fixed integrally to a carrier and the carrier is coupled to the motor via a second one-way clutch (RC), whereby the output side provides a constant speed output in the forward direction when the planetary gear is revolved but provides an accelerated output in the forward direction when the planetary gear is rotated with respect to the constant speed output.

* * * * *